United States Patent [19]
Takenaka et al.

[11] Patent Number: 5,956,962
[45] Date of Patent: *Sep. 28, 1999

[54] AIR CONDITIONER

[75] Inventors: Hiroshi Takenaka, Shimizu; Hirokiyo Terada, Shizuoka; Minetoshi Izushi; Kensaku Oguni, both of Shimizu; Makoto Nagai, Yaizu; Shunji Sasaki; Yasuji Sakuma, both of Shimizu; Kenji Tokusa, Shizuoka, all of Japan

[73] Assignee: Hitachi, Ltd., Tokyo, Japan

[ * ] Notice: This patent is subject to a terminal disclaimer.

[21] Appl. No.: 08/907,159

[22] Filed: Aug. 6, 1997

Related U.S. Application Data

[63] Continuation of application No. 08/751,791, Nov. 18, 1996, Pat. No. 5,689,965, which is a continuation of application No. 08/170,861, Dec. 21, 1993, abandoned.

[30] Foreign Application Priority Data

Jan. 11, 1993 [JP] Japan ..................................... 5-002570

[51] Int. Cl.⁶ ............................. F25B 41/00; G05D 23/00
[52] U.S. Cl. .................................. 62/211; 62/222; 236/51
[58] Field of Search ............................. 62/211, 222, 262, 62/160, 175; 236/51

[56] References Cited

U.S. PATENT DOCUMENTS

| | | | |
|---|---|---|---|
| 4,651,535 | 3/1987 | Alsenz | 62/223 |
| 4,787,213 | 11/1988 | Gras et al. | 62/212 |
| 5,241,833 | 9/1993 | Ohkoshi | 62/126 |

FOREIGN PATENT DOCUMENTS

| | | | |
|---|---|---|---|
| 0364834 | 4/1990 | European Pat. Off. . | |
| 60-62543 | 4/1985 | Japan | F24F 11/00 |
| 6062543 | 4/1985 | Japan | F24F 11/00 |
| 60-226667 | 11/1985 | Japan . | |
| 3-211370 | 1/1990 | Japan . | |
| 2-101342 | 4/1990 | Japan . | |
| 03211370 | 9/1991 | Japan | F25B 13/00 |

*Primary Examiner*—William Wayner
*Attorney, Agent, or Firm*—Antonelli, Terry, Stout & Kraus, LLP

[57] ABSTRACT

An air conditioner in accordance with the invention comprises a first unit including a compressor and a heat exchanger; a second unit including a heat exchanger; a refrigerant circuit connecting the compressor and the heat exchanger of the first unit, with the heat exchanger of the second unit, through which a refrigerant flows; a refrigerant pressure reduction valve disposed in the refrigerant circuit and provided in the second unit; a control unit provided in the first unit for controlling the refrigerant pressure reduction valve in the second unit.

4 Claims, 2 Drawing Sheets

AIR CONDITIONER

This application is a Continuation of application Ser. No. 08/751,791, now U.S. Pat. No. 5,689,965 filed Nov. 18, 1996, which is a continuation application of Ser. No. 08/170,861, filed Dec. 21, 1993.

The present invention relates to air conditioners of the separation type.

In general, an air conditioner of the separation type comprises one unit provided with a compressor and a heat exchanger, and another unit provided with a heat exchanger and an refrigerant pressure reduction means which is located in a space to be air-conditioned. A refrigerant circuit interconnects both units to provide a refrigeration cycle. Some of the separation type air conditioners include valve means designed to reverse a flow direction of a refrigerant in order to change over between space heating and space cooling. A control unit is provided to control the refrigerant pressure reduction means (for example, an electric expansion valve), so that an interior of the space is maintained at a desired condition. For example, the one unit is located outside of a dwelling and the other unit is located inside of the dwelling to serve for provide heating and cooling of a room.

In these air conditioners, a control unit is arranged inside of the an other unit as disclosed JP-A-60-226667 and JP-A-3-211370. Accordingly, in the case when it is desired to replace the compressor or a whole outside unit (or the one unit), it is necessary to replace not only the outside unit (the one unit) but also the inside unit (the an other unit) because a control unit is required to meet the specification of the compressor to be replaced. However, since most of the inside units are built-in or secured in being air conditioned the rooms, their replacements cannot easily be done.

OBJECT AND SUMMARY OF THE INVENTION

The present invention has an object to provide an air conditioner which makes it unnecessary to replace the inside unit (the an other unit) in a case when it is desired to replace the compressor or a whole outside unit (the one unit).

To this end, in accordance with the present invention, there is provided an air conditioner which comprises: a first unit including a compressor and a heat exchanger; a second unit including a heat exchanger; a refrigerant circuit connecting the compressor and the heat exchanger of the first unit with the heat exchanger of the second unit, through which a refrigerant flows; a refrigerant pressure reduction means disposed in the refrigerant circuit and provided in the second unit; and a control unit provided in the first unit for controlling the refrigerant pressure reduction means in the second unit.

DETAILED DESCRIPTION OF PREFERRED EMBODIMENTS

Figure 1:
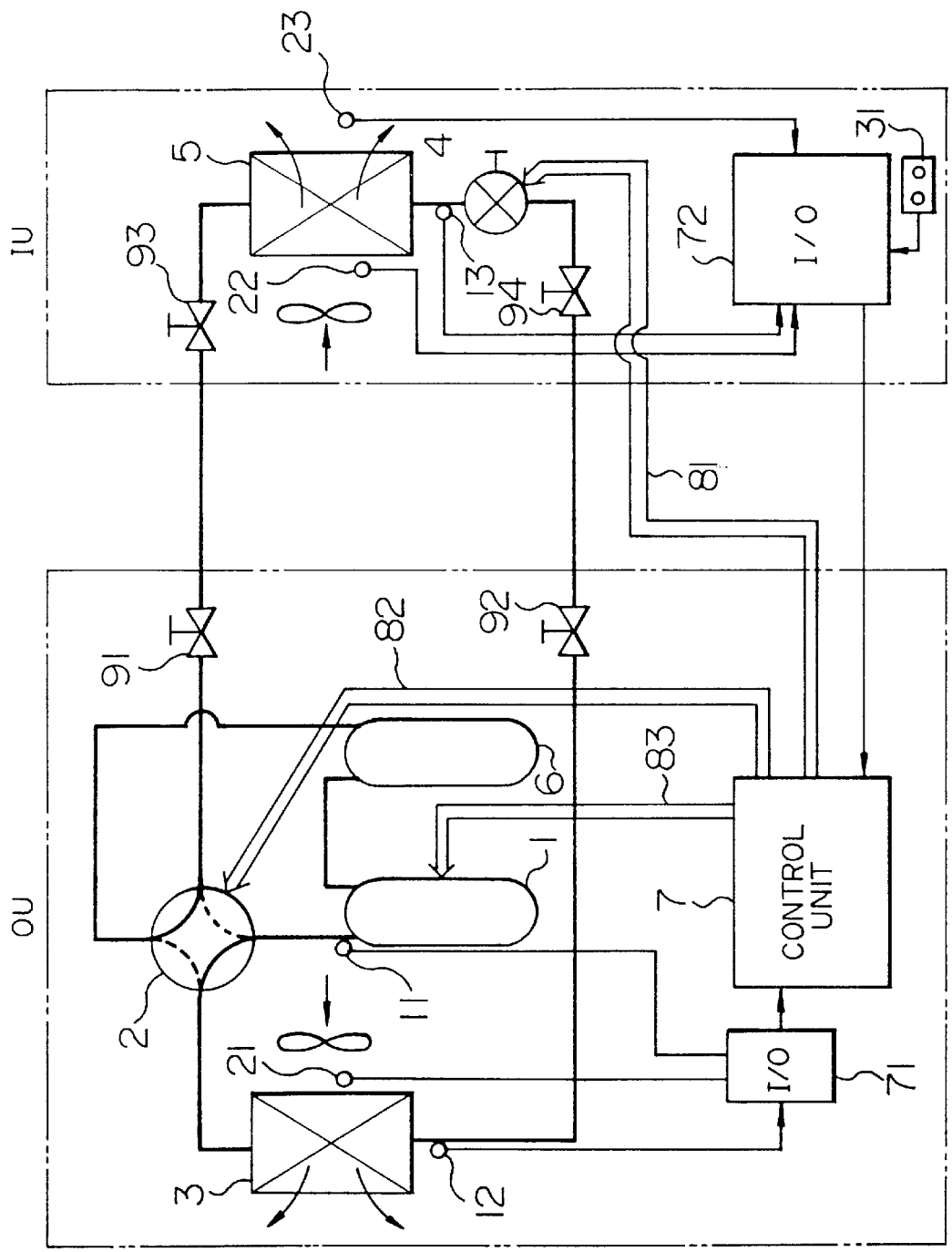
FIG. 1 is a diagram illustrating an air conditioner in accordance with a one embodiment of the present invention having a single inside unit.

Referring to FIG. 1, an air conditioner is provided with one outside unit (OU) located outside of a dwelling and with one inside unit (IU) located inside of a room of the dwelling.

The outside unit (OU) comprises a compressor 1, a reversing valve 2, a heat exchanger 3 and an accumulator 6. The inside unit (IU) comprises an electric expansion valve 4 and a heat exchanger 5. These elements are connected together by a pipe line through which the refrigerant flows to form a refrigerating cycle.

In cooling mode, the compressor 1 compresses the refrigerant into the gaseous refrigerant of a high temperature and a high pressure. In the heat exchanger 3, the gaseous refrigerant from the compressor 1 through the reversing valve 2 emits the heat to the outside and then condenses into the reduced refrigerant. The reduced refrigerant from the heat exchanger 3 adiabatically expands in the expansion valve 4 of the inside unit (IU). Further, the reduced refrigerant evaporates in the heat exchanger 5 into the gaseous refrigerant. At this point, the heat is absorbed from the air in the room to cool the latter. The gaseous refrigerant from the heat exchanger 5 flows via the reversing valve 2 into the accumulator 6 where the liquid refrigerant is removed. The liquid refrigerant-free gaseous refrigerant returns back to the compressor 1.

In heating mode, the reversing valve 2 is switched over in a state shown by the broken line. The high-temperature and high pressure gaseous refrigerant from the compressor 1 emits the heat outside in the heat to the exchanger 5 of the inside unit (IU) and then condenses into the reduced refrigerant. At this point, the heat is transferred to the air in the room so as to heat the latter. Next, the reduced refrigerant from the heat exchanger 5 adiabatically expands in the expansion valve 4 of the inside unit (IU). Further, the reduced refrigerant evaporates in the heat exchanger 3 into the gaseous refrigerant and flows via the reversing valve 2 into the accumulator 6 where the liquid refrigerant is removed. The liquid refrigerant-free gaseous refrigerant returns back to the compressor 1.

In either case, an opening degree of the electric expansion valve 4 of the inside unit (IU) is controlled in order to achieve a desired room temperature. This control is effected by a control unit 7 provided in the outside unit (OU). The control unit 7 determines an appropriate opening degree of the electric expansion valve 4 based on the refrigerant temperatures in the respective portions of the refrigerant cycle, the temperatures of the air blown out of the heat exchangers and the operating mode demands or the like.

More specifically, with regard to the refrigerant temperature within the refrigerant cycle, a sensor 11 detects the temperature of the refrigerant flowing out of the compressor 1, a sensor 12 detects the temperature of the refrigerant flowing out of the heat exchange 3 during the cooling mode, and a sensor 13 detects the temperature of the refrigerant flowing into the heat exchanger 5 during the cooling mode. As regards the temperature of the air blown out of the heat exchanger, a sensor 21 detects the temperature of the air sucked into the heat exchanger 3. A sensor 22 detects the temperature of the air sucked into the heat exchanger 5 at the cooling mode and a sensor 23 detects the temperature of the air blown out of the heat exchanger 5 at the cooling mode. The information from an operating mode selection unit 31 and the detected temperatures are converted into electrical signals at interfaces 71 and 72 and these electrical signals are input into the control unit 7. The control unit 7, based upon the electrical signals from the interfaces 71 and 72, determines a desired opening degree of the electric expansion valve 4 in accordance with a predetermined procedure. The control unit 7 feeds a pulse train 81 having a duty ratio corresponding to the desired opening degree of the electric expansion valve 4 thereto, so that the opening degree of the electric expansion valve 4 is controlled.

Further, the control unit 7, based upon the electrical signals from the interfaces 71 and 72, feeds a command signal 82 for switching over the reversing valve 2 and a command signal 83 for altering a capacity of the compressor 1 to the reversing valve 2 and the compressor 1, respectively, if necessary.

Next, consider the case when in a sparation-type air conditioner the whole outside unit (OU) needs to be replaced or the compressor 1 in the outside unit (OU) needs to be replaced. In the above-mentioned airconditioner, valves 91–94 are first closed. After replacing the whole outside unit (OU) or the compressor, the outside unit (OU) and the inside unit (IU) are re-connected together and the valves 91–94 are opened. This will complete a replacement. In this embodiment, since the control unit 7 determines a desired opening degree of the electric expansion valve 4 in accordance with a procedure corresponding to the new compressor is renewed together with the outside unit (OU), there will be no need to replace the inside unit (IU). To the contrary in a prior-art air conditioner, since the control unit is provided in the inside unit (IU), the inside unit (IU) needs to be replaced in order to replace the control unit in case of replacing the outside unit (OU). This is a serious matter for a built-in type inside unit (IU). Specifically, the replacement of the built-in type inside unit increases the time and cost required to replace the whole air conditioner. In contrast, in accordance with the present invention, the replacement of the inside unit (IU) is eliminated. This means that since the inside unit (IU) need not be replaced, the users can enjoy an advantage that the time and the cost required for replacement of an air conditioner is markedly reduced.

Figure 2:
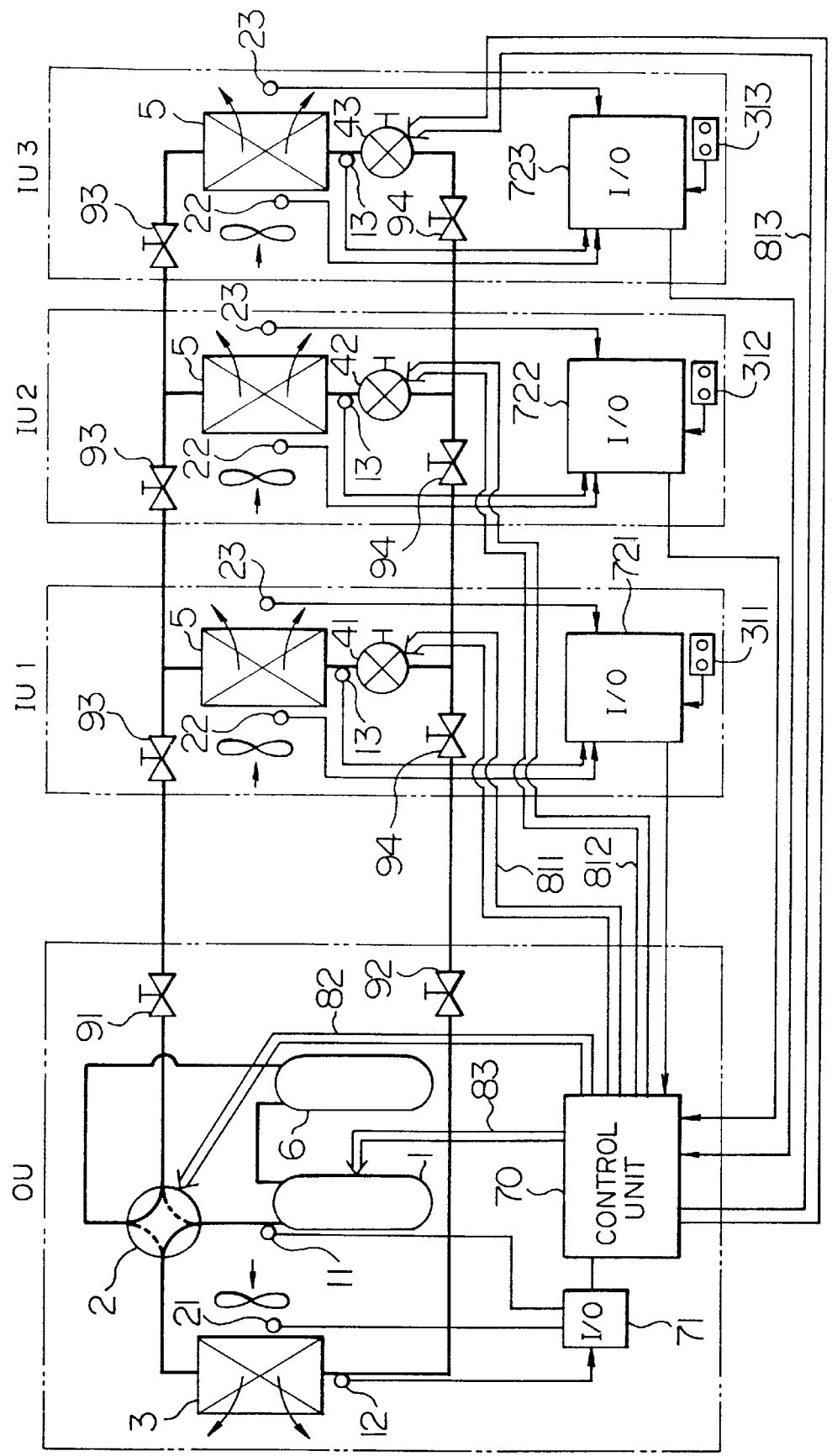
FIG. 2 is a diagram illustrating an air conditioner in accordance with another embodiment of the present invention having a plurality of inside units.

FIG. 2 illustrates another embodiment of the present invention in which there are provided one outside unit (OU) and a plurality of inside units (in this embodiment, three inside units IU1–IU3) in rooms on the respective floors inside of the dwelling. The outside unit (OU) and each of the inside units (IU1 to IU3) are identical to those shown in FIG. 1, respectively. In this embodiment, the inside units (IU1 to IU3) are arranged in parallel to one another.

The temperatures detected in the respective rooms, and temperature detected in the outside unit (OU) and the information from the operating mode selection units 311–313 are converted into electrical signals at the interfaces 71 and 721–723, and these electrical signals are input into a control unit 70. The control unit 70, based upon the electrical signals from the interfaces 71 and 721–723, determines the respective opening degrees of the electric expansion valves 41, 42 and 43. The control unit 70 feeds pulse trains 811–813 having duty ratios corresponding to the required opening degrees of the electric expansion valves 41–43, respectively to these valves to control the opening degrees thereof. In this manner, the temperature of each room is maintained as desired.

In this embodiment, in the case when it is desired to replace a whole outside unit (OU) or the compressor 1 of the outside unit (OU), the inside units (IU1 to IU3) do not need to be replaced with new ones since the control unit 70 determines the desired opening degrees of the electric expansion valves 41–43 in accordance with a procedure required for a new compressor which is replaced together with the output unit (OU). This eliminates the need for a user to replace the inside unit (IU), which lessens the time and the cost required for replacement of air conditioner substantially. In addition, this enables a manufacturer to make inside units (IU) of the same construction for a variety of outside units, thus holding down the cost of production. Further, a product stock of the inside units can be readily managed and the inside units can be readily made available by the distributors.

What is claimed is:

1. An air conditioner comprising:

an inside unit including an electric expansion valve and an interior heat exchanger; and an outside unit including a compressor and an exterior heat exchanger, wherein said outside unit further includes means for determining an opening degree of said expansion valve in accordance with temperature and operation information from said inside unit, and wherein said air conditioner can be updated by replacing said outside unit with a new outside unit, without replacement of said inside unit.

2. An air conditioner according to claim 1, wherein the outside unit includes a control device for feeding a pulse train directly to said electric expansion valve to control the opening degree thereof.

3. An inside unit of an air conditioner comprising an electric expansion valve and an interior heat exchanger, wherein said inside unit feeds temperature and operation information to an outside unit including a compressor and an exterior heat exchanger, and wherein said electric expansion valve of said inside unit is controlled to an opening degree thereof directly by the outside unit.

4. An outside unit of an air conditioner comprising a compressor and an exterior heat exchanger, wherein said outside unit receives temperature and operation information from an inside unit including an electric expansion valve and an interior heat exchanger and determines an opening degree of the expansion valve of the inside unit in accordance with the temperature and the operation information from the inside unit.

* * * * *